ＵＳ０１０４４７７１６Ｂ２

United States Patent
Ahuja et al.

(10) Patent No.: US 10,447,716 B2
(45) Date of Patent: Oct. 15, 2019

(54) SYSTEMS AND METHODS FOR PROCESSING HYPERVISOR-GENERATED EVENT DATA

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Pankaj Sitpure, San Jose, CA (US)

(73) Assignee: ShieldX Networks, Inc., San Jose, CA (US)

( * ) Notice: Subject to any disclaimer, the term of this patent is extended or adjusted under 35 U.S.C. 154(b) by 132 days.

(21) Appl. No.: 15/338,184

(22) Filed: Oct. 28, 2016

(65) Prior Publication Data

US 2018/0124079 A1    May 3, 2018

(51) Int. Cl.
*H04L 29/06* (2006.01)
*G06F 9/455* (2018.01)
*G06F 21/55* (2013.01)

(52) U.S. Cl.
CPC ...... *H04L 63/1425* (2013.01); *G06F 9/45558* (2013.01); *G06F 21/55* (2013.01); *H04L 63/1416* (2013.01); *H04L 63/20* (2013.01); *G06F 2009/45587* (2013.01); *G06F 2009/45595* (2013.01)

(58) Field of Classification Search
CPC ............ H04L 63/1425; H04L 63/1416; H04L 63/20; G06F 9/45558; G06F 2009/45587; G06F 2009/45595
See application file for complete search history.

(56) References Cited

U.S. PATENT DOCUMENTS

| 8,825,861 | B2 * | 9/2014 | Rao ...................... G06F 9/5038 709/226 |
| 9,438,634 | B1 * | 9/2016 | Ross ....................... H04L 63/20 |
| 9,607,151 | B2 * | 3/2017 | Mooring ............... G06F 21/566 |
| 9,875,086 | B1 * | 1/2018 | Anderson ................ G06F 8/20 |
| 2010/0017801 | A1 * | 1/2010 | Kundapur ........... G06F 9/45558 718/1 |
| 2013/0298244 | A1 * | 11/2013 | Kumar .................... G06F 21/52 726/25 |
| 2013/0305243 | A1 * | 11/2013 | Hiki ...................... G06F 9/5077 718/1 |
| 2014/0130039 | A1 * | 5/2014 | Chaplik .............. G06F 9/45558 718/1 |

(Continued)

*Primary Examiner* — Mohammad A Siddiqi
(74) *Attorney, Agent, or Firm* — Nicholson De Vos Webster & Elliott LLP

(57) ABSTRACT

Systems, methods, and apparatuses enable a network security system to more efficiently process and respond to events generated by hypervisors and other associated components of a networked computer system. In this context, a hypervisor event refers broadly to any action that occurs related to one or more components of a hypervisor (including the hypervisor itself, virtual servers hosted by the hypervisor, etc.) and/or to data identifying the occurrence of the action (s) (e.g., a log entry, a notification message, etc.). A security service obtains and analyzes event data from any number of different types of hypervisors, where each different type of hypervisor may represent events differently and/or make event data accessible in different ways, among other differences.

30 Claims, 13 Drawing Sheets

(56) References Cited

U.S. PATENT DOCUMENTS

2014/0310706 A1* 10/2014 Bruso ............... G06F 17/30336
    718/1
2018/0359264 A1* 12/2018 Sweet ................... G06F 21/577

* cited by examiner

SYSTEMS AND METHODS FOR PROCESSING HYPERVISOR-GENERATED EVENT DATA

TECHNICAL FIELD

Embodiments relate generally to computer network security. More specifically, embodiments relate to techniques for processing event data generated by hypervisors of a networked computer system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

The vast majority of organizations today rely on computer systems and networks for an increasingly wide variety of business operations. As the reliance on these systems networks has grown, so too has the importance of securing those computer systems and networks against internal and external security threats. However, the breadth and complexity of security threats targeting such computer systems and networks is far and wide and ever growing. To monitor and address these security threats, organizations increasingly rely on sophisticated computer network security applications and hardware such as firewalls, anti-virus tools, data loss prevention software, etc.

One aspect of many network security applications involves processing event data generated by monitored components of a computing environment. For example, a network security application may detect and log events generated by network devices, system software running on various devices, application software, among other event-generating components. The types of events generated by these and other components may correspond, for example, to instances of network messages sent and/or received by the devices, to device and/or application status messages, error messages, and so forth.

In computing environments which include virtualized computing resources, one source of event data is often hypervisors running on one or more physical machines within the environments. At a high level, a hypervisor is a software or firmware component that manages the creation and operation of one or more virtual servers on host hardware. Each virtual server running on a hypervisor may share hardware and software resources with other virtual servers running on the same hypervisor. During operation, a hypervisor may generate event data relating, for example, to the creation of virtual servers at the hypervisor, to the performance of virtual servers managed by the hypervisor, to error and status information related to hosted virtual servers, etc. However, computing environments might include any of several different types of hypervisors, and may even include different types of hypervisors within the same environment, and the way in which event data is generated and made accessible generally is not uniform across different types of hypervisors. As such, accurately analyzing and responding to hypervisor-generated event data in a consistent manner presents many challenges.

DETAILED DESCRIPTION

Figure 1:
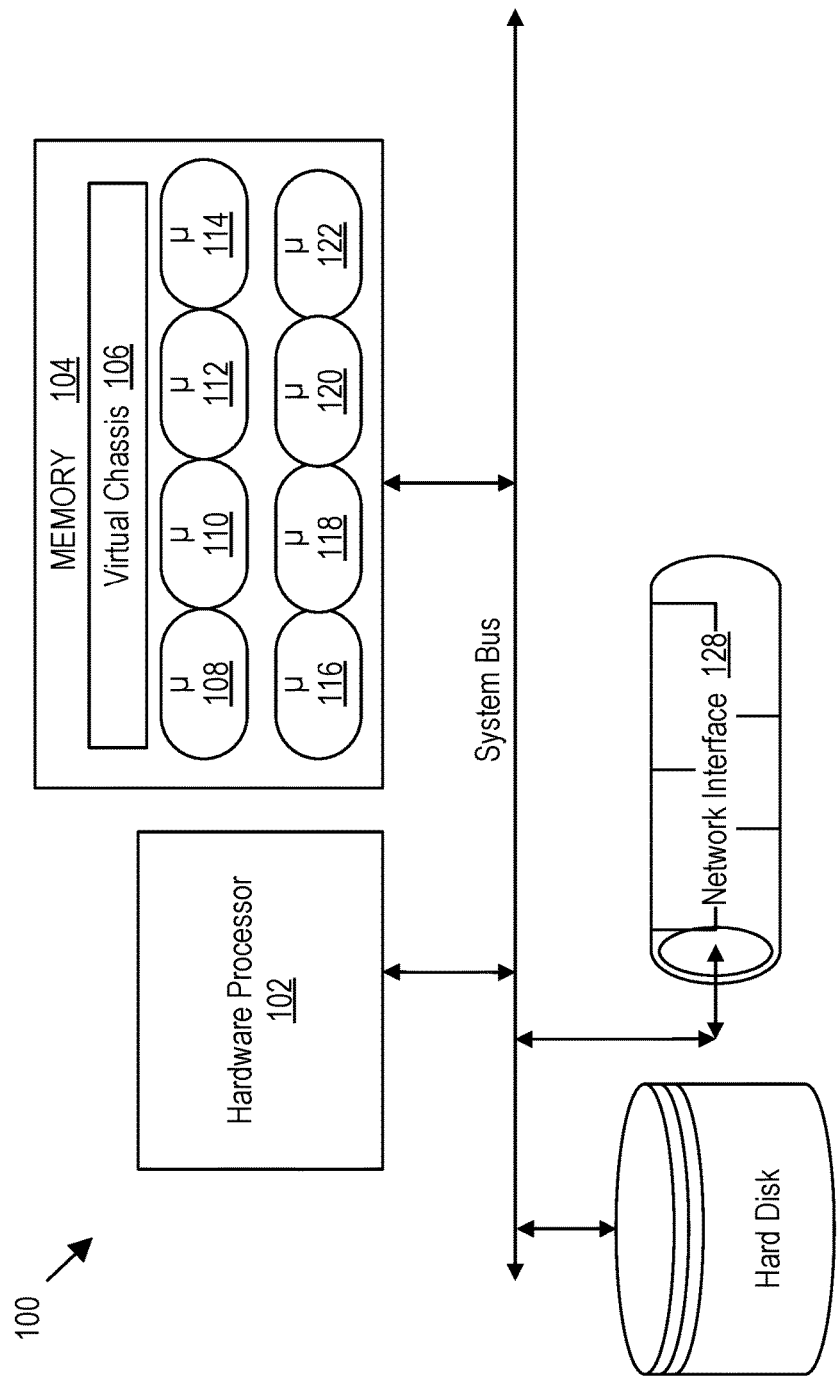
FIG. 1 is a block diagram illustrating computer hardware for loading network security system microservices from a memory and executing them by a processor in accordance with the disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form to avoid unnecessarily obscuring embodiments of the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:

1.0. General Overview
2.0. Operating Environment
   2.1. System Overview
   2.2. Hypervisor Event Processing Microservices
3.0. Functional Overview
   3.1. Hypervisor Event Processing Overview
   3.2. Obtaining Hypervisor Events
   3.3. Normalizing Hypervisor Events
4.0. Example Embodiments
5.0. Implementation Mechanism—Hardware Overview
6.0. Extensions and Alternatives
1.0. General Overview Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary and/or underutilized resources devoted to virtual private network (VPN) services, data loss prevention (DLP) services, or other security services.

One way in which many modern computing environments scale resources more efficiently is using virtualized computing resources. A virtualized computing resource generally refers to an abstracted physical computing resource presented to an operating system and its applications by means of a hypervisor, such that the virtual computing resources (compute, memory, network connectivity, storage, etc.) are configurable and may be different from those of the physical computing resource. According to one embodiment, these types of virtualized infrastructures are used to efficiently scale network security applications based on the use of "microservices," where a microservice is a particular type of virtualized computing resource packaged as a software container. For example, a network security platform may comprise separate microservices providing firewall resources, DLP services, VPN services, etc. In general, the use of such microservices can provide greater flexibility because the microservices can be more easily deployed and scaled in response to variable demands for various types of network security services.

The type of efficient network security application scaling described above can be achieved with the use of a security application that is configured to scale network security services using microservices. Although many of the techniques described herein are explained with reference to a microservice-based network security application, the techniques are also applicable to other types of network security systems.

2.0. Operating Environment
2.1. System Overview

FIG. 1 is a block diagram illustrating an embodiment of a scalable microservice architecture using microservices. Network security system microservices 108-122 are stored in memory 104 (e.g., volatile memory such as Random Access Memory (RAM) and/or non-volatile memory such as disk) and executed by one or more hardware processors or processor cores 102. Network security system microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which is also a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
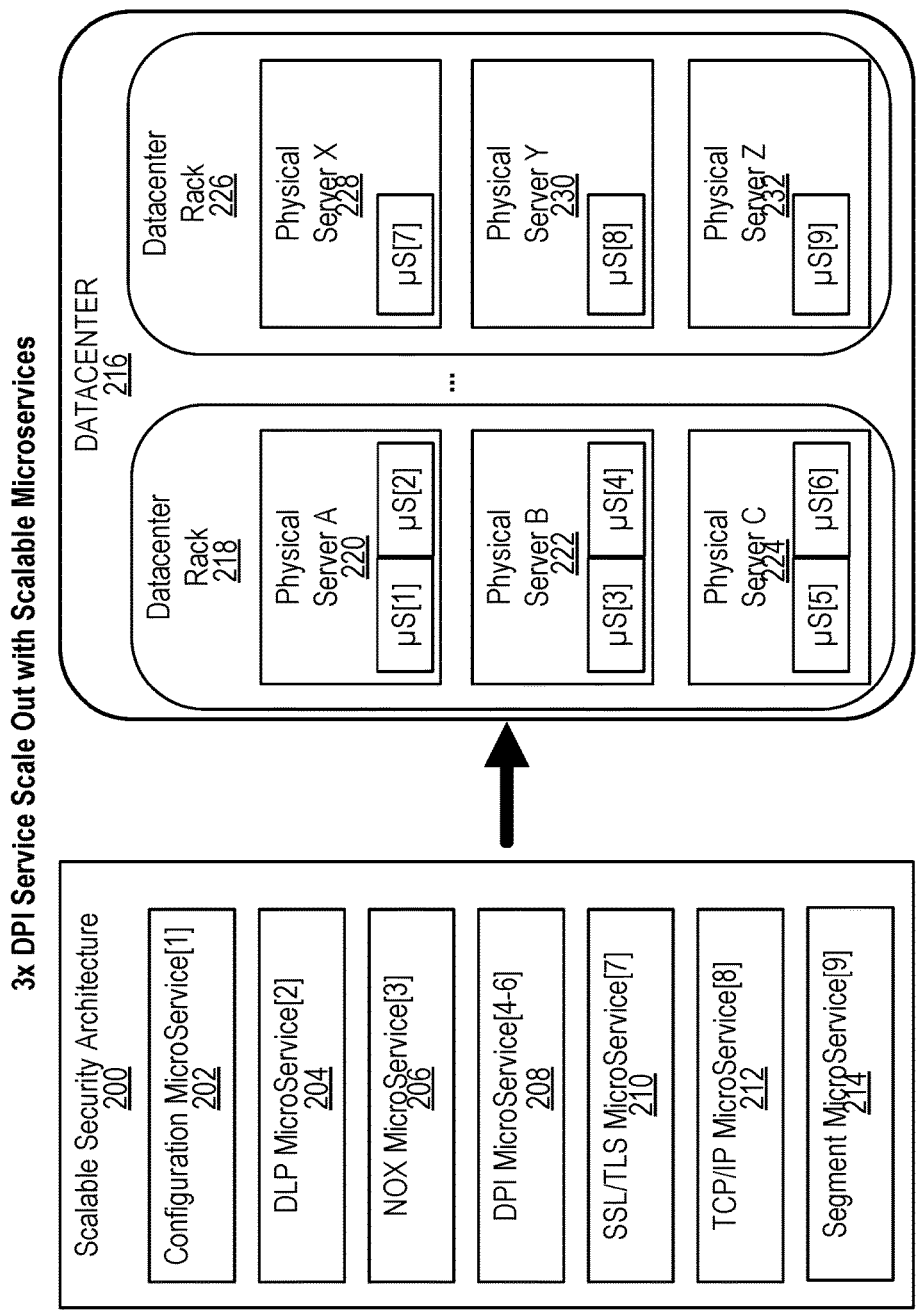
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
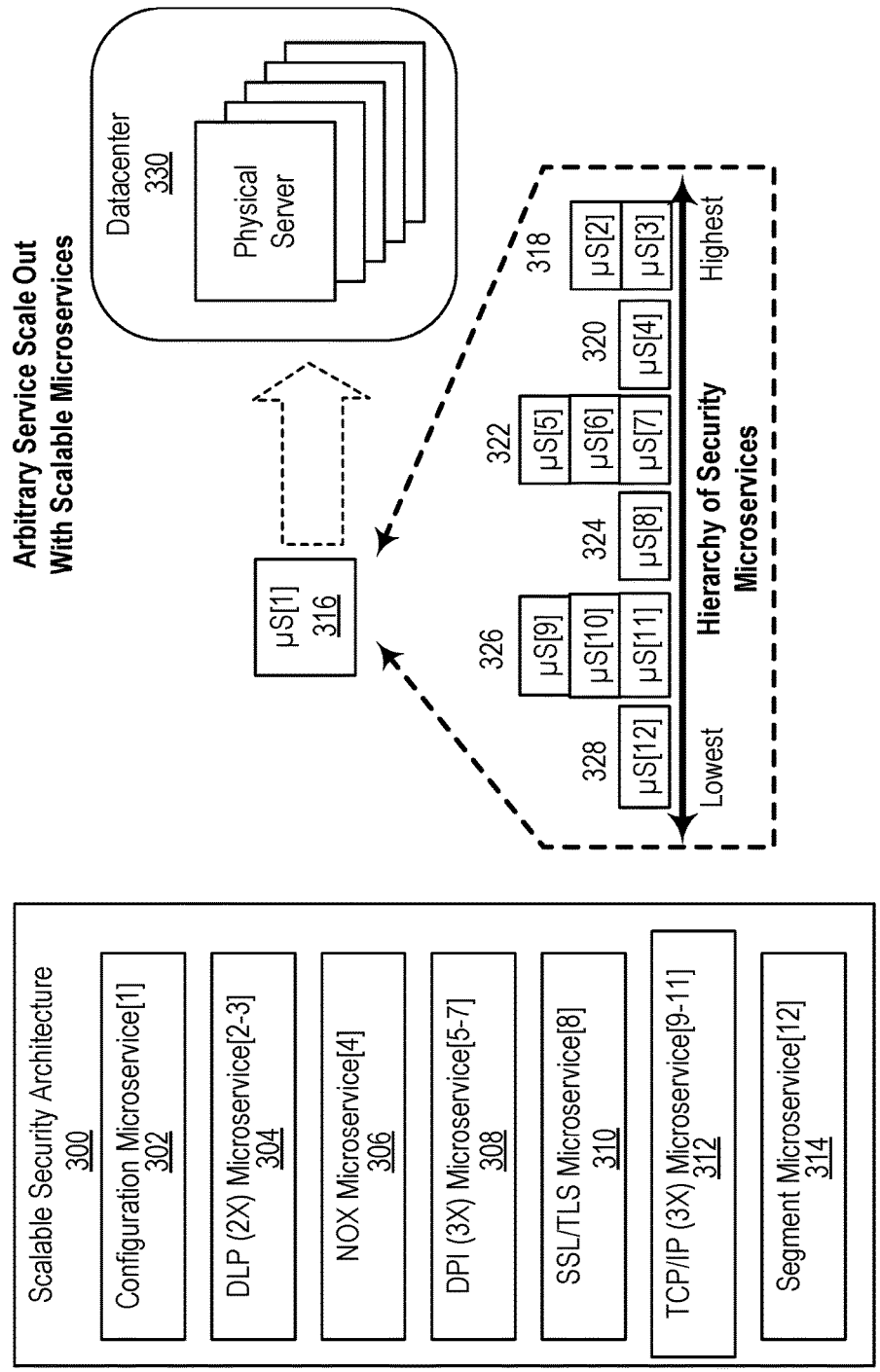
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
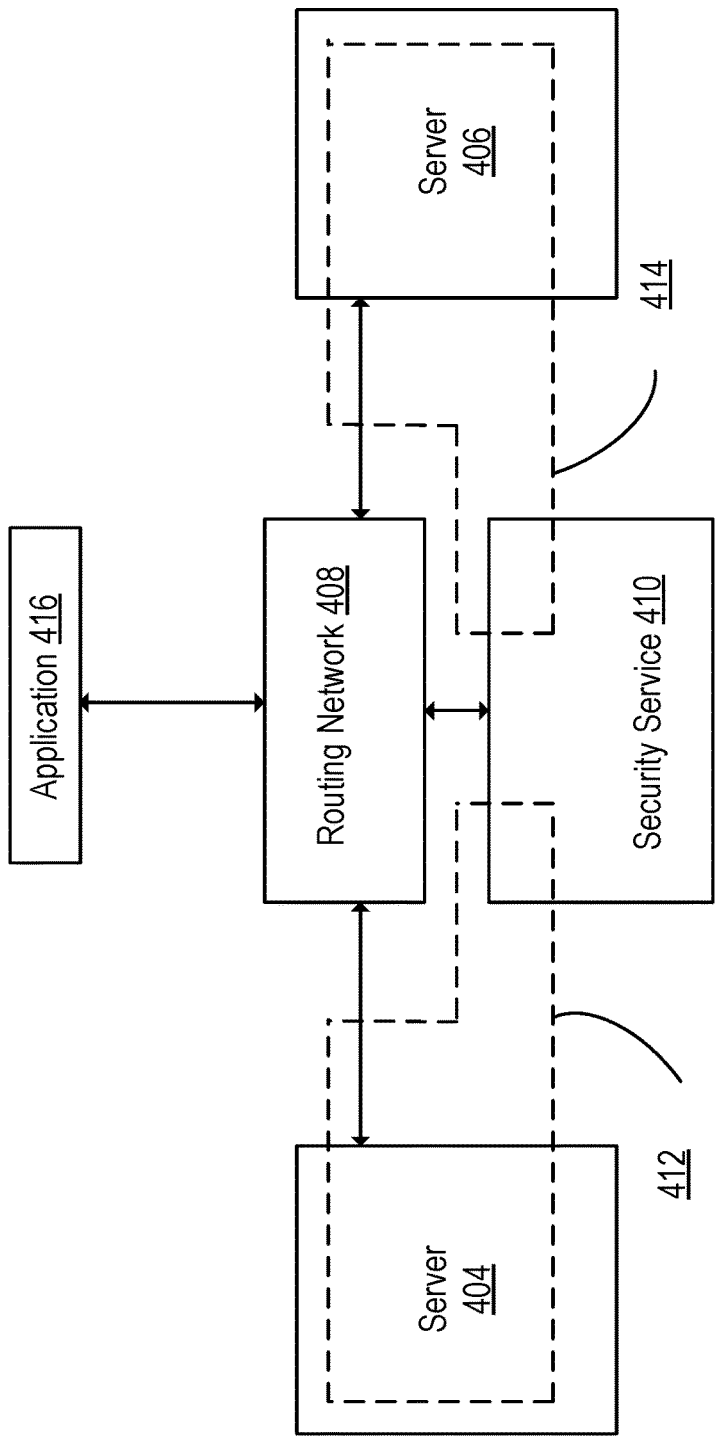
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 may not be confined to one physical server such as a server 404, 406. For example, one or more microservices of the security service 410 may be executed on server 404, and other microservices of the security service 410 may be executed on server 406. In some embodiments, the security service 410 is executed on a different server from one or more servers for which the security service is responsible for monitoring and protecting.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, by virtue of routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
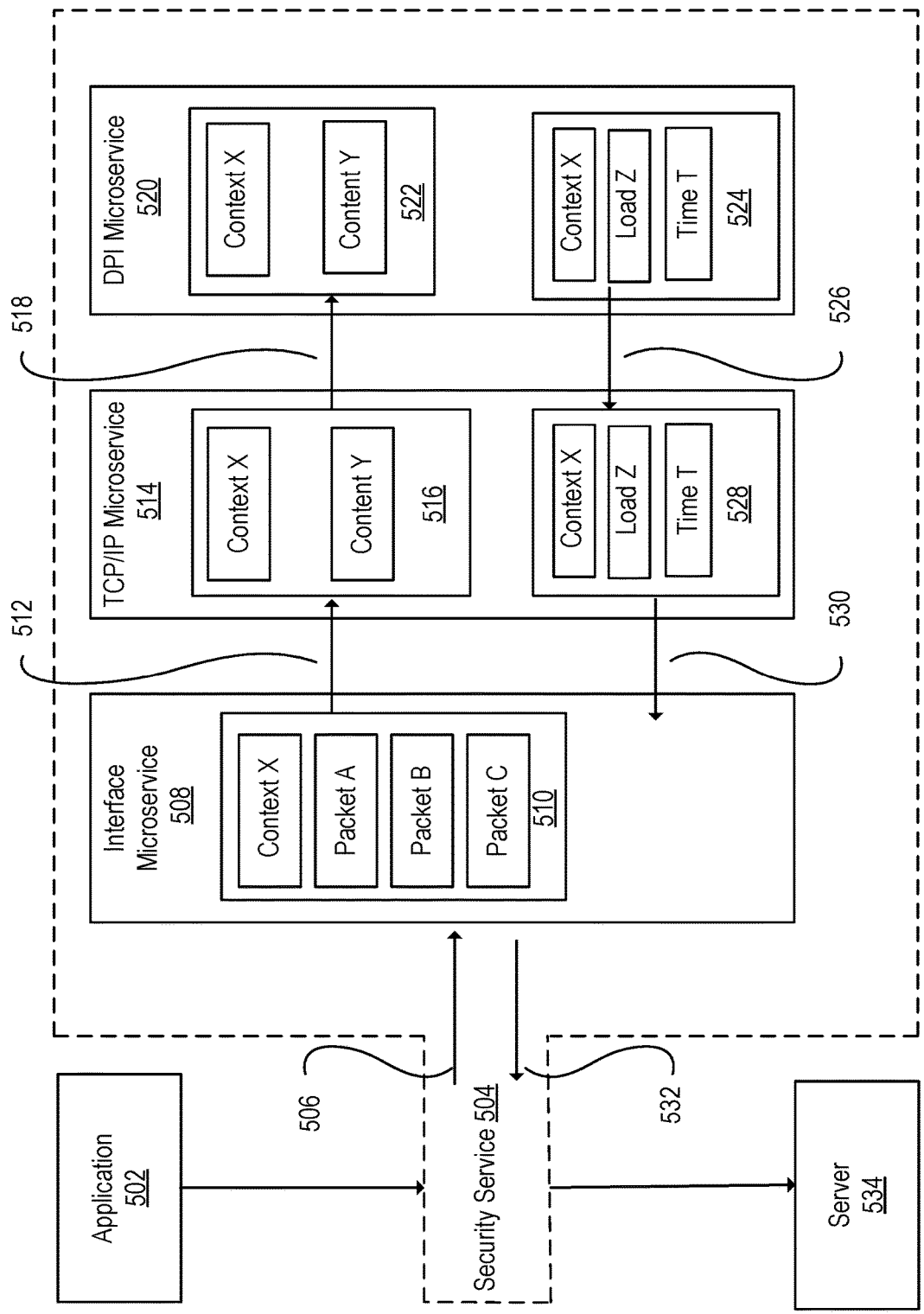
FIG. 5 is a block flow diagram illustrating application data traversing to a server after passing through a hierarchy of a security microservices in accordance with the disclosed embodiments.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and/or destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCPI/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
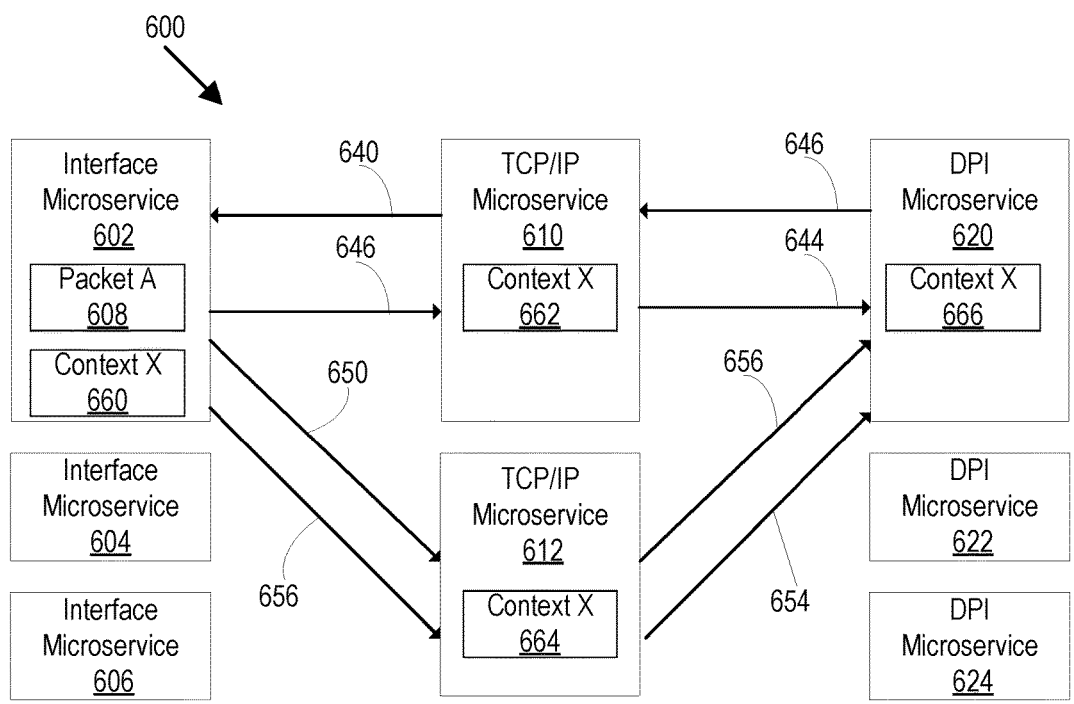
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices and/or a different number of microservice types. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCIP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Hypervisor Event Processing Microservices

Figure 7:
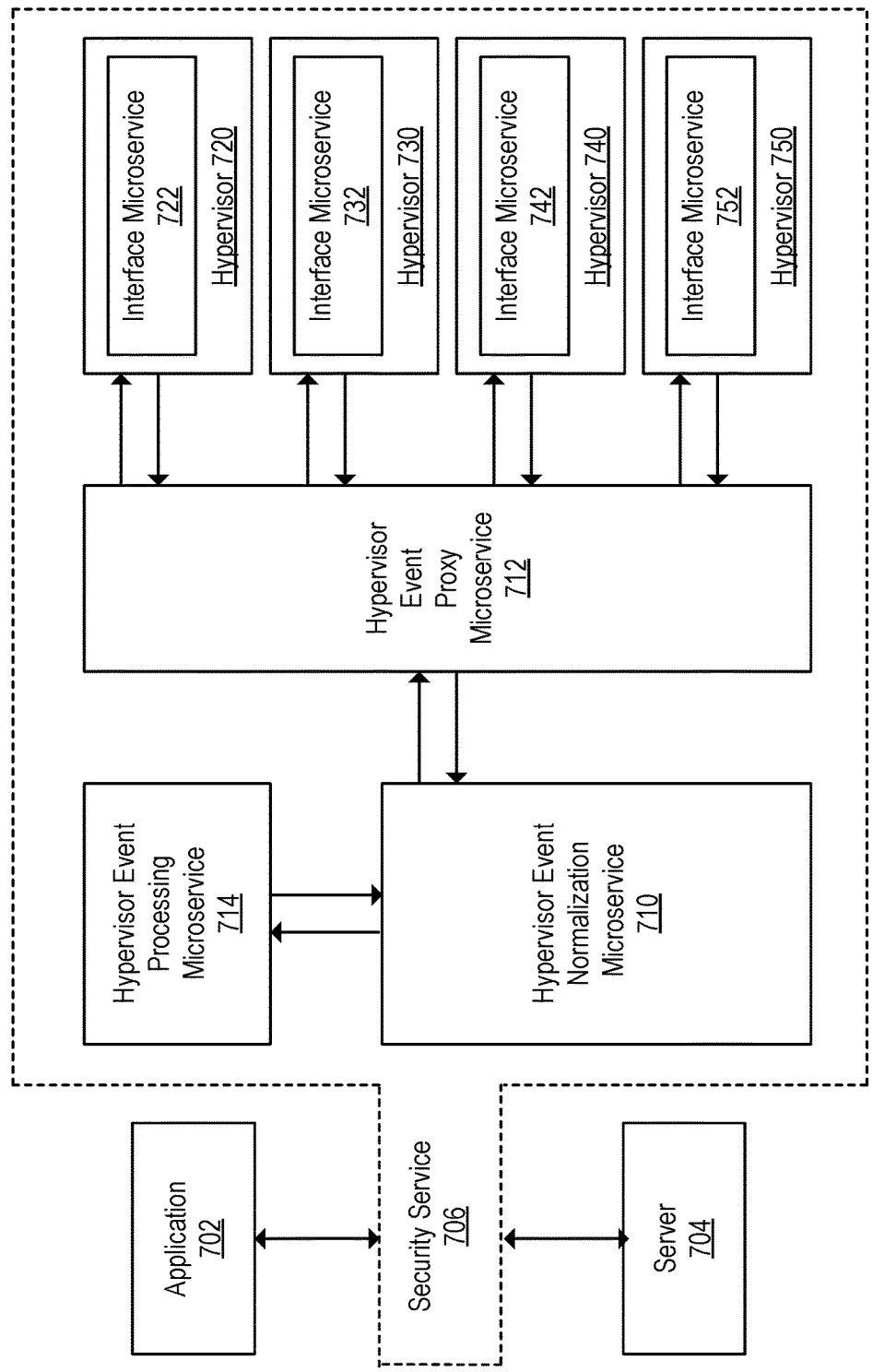
FIG. 7 is a block diagram illustrating an example security service including hypervisor event processing microservice(s) in accordance with the disclosed embodiments.

FIG. 7 is a block diagram illustrating an example of a security service including hypervisor event processing microservice(s). In an embodiment, a security service 706 comprises a plurality of microservices, including interface microservices 722, 732, 742, and 752, a hypervisor event proxy microservice 712, a hypervisor event normalization microservice 710, and a hypervisor event processing microservice 714. For example, the security service 706 may correspond to the security service 410 depicted in FIG. 4, where a plurality of microservices are running within the security service 706, and which monitors network traffic and other data sent between an application 702 and one or more servers 704. FIG. 7 represents an example embodiment that is provided for purposes of illustrating a clear example; other embodiments may use different arrangements.

In an embodiment, each of hypervisors 720, 730, 740, and 750 broadly represents any type of software (executed by a processor), firmware (executed by a processor), and/or hardware capable of creating and running one or more virtual servers. As an example, each of the hypervisors in FIG. 7 may be one of a VMware® ESX™/ESXi™ hypervisor, a Citrix® XenServer® hypervisor, a Microsoft® Hyper-V® hypervisor, or any other type of hypervisor. Each of hypervisors 720, 730, 740, and 750 may be the same type of hypervisor as one or more other hypervisors, a different type of hypervisor from other hypervisors, a same type of hypervisor configured different from other hypervisors, and any combination thereof. As indicated above, an interface microservice (e.g., interface microservices 722, 732, 742, or 752) running on each hypervisor abstracts the sending of packets and other data from any operating system and/or applications running through the security service for inspection. As described in more detail herein, an interface microservice further enables a security service 706 to obtain event data generated by the hypervisors and associated components.

In an embodiment, a hypervisor event proxy microservice 712, a hypervisor event normalization microservice 710, and a hypervisor event processing microservice 714 collectively obtain and process event data generated by hypervisors (e.g., hypervisors 720, 730, 740, and 750) running within one or more computing environments. In this context, a hypervisor event may correspond broadly to any type of action and/or occurrence related to one or more components of a hypervisor (including the hypervisor itself, virtual servers running on the hypervisor, etc.) and/or to data identifying the occurrence of the action. Examples of hypervisor events include, but are not limited to, starting the hypervisor, stopping the hypervisor, creating a new virtual server, removing a virtual server, an error or other status message associated with the hypervisor or a virtual server, and so forth.

A hypervisor event may correspond to an occurrence of the event itself (e.g., based on detecting a hypervisor starting, based on detecting a hypervisor shutting down, based on detecting a network message sent by a virtual server running on a hypervisor, etc.), or a hypervisor event may correspond to data created in response to an event occurrence (e.g., a log entry created in in response to a hypervisor error condition, a notification generated in response to a virtual machine failure, etc.). As described in more detail hereinafter, a hypervisor event proxy microservice 712 and a hypervisor event normalization microservice 710 obtain event data from any number of different types of hypervisors, normalize the obtained event data, and send the normalized event data to a hypervisor event processing microservice 714 for further processing. In this manner, a hypervisor event processing microservice 714 can process hypervisor-generated event data in a consistent manner regardless of a type of hypervisor from which the event data originates.

In an embodiment, a hypervisor event proxy microservice 712 obtains event data generated by any number of hypervisors (e.g., from hypervisors 720, 730, 740, and 750) running within one or more computing environments. As described in more detail herein, a hypervisor event proxy microservice 712 abstracts processes for obtaining event data generated by different types of hypervisors. For example, depending on how certain types of event data are made accessible by different types of hypervisors, a hypervisor event proxy microservice 712 may obtain event data from the hypervisors based on receiving pushed event data, based on polling the hypervisor, or any other mechanism.

In an embodiment, a hypervisor event normalization microservice 710 processes events received from one or more hypervisor event proxy microservices 712. As indicated above, because a hypervisor event proxy microservice 712 abstracts processes for obtaining events from hypervisors (e.g., pushed and pulled events), a hypervisor event normalization microservice 710 receives all events as pushed event data from a hypervisor event proxy microservice.

In one embodiment, each of the microservices comprising the security service 706 represents a software "container," where a container is an isolated user space instance within a virtualization environment in which the kernel of an operating system allows for the existence of multiple isolated user-space instances. In other examples, one or more of the microservices of security service 706 may represent a virtual machine instance, a thread of execution, a standalone software application, or any other type of computing module. In some embodiments, event processing functionality of a security service 706 is provided by a plurality of subevent processing services and/or event processing microservices, wherein the number of microservices in operation at any given time may be scaled to meet a number of events processed by security service 706 during a particular period of time.

3.0. Functional Overview

Approaches, techniques, and mechanisms are disclosed that enable a network security system to more efficiently process and respond to event data generated by hypervisors and other associated components of a networked computer system. In this context, a hypervisor event refers broadly to any action that occurs related to one or more components of a hypervisor (including the hypervisor itself, virtual servers hosted by the hypervisor, etc.) and/or to data identifying the occurrence of the action(s) (e.g., a log entry, a notification message, etc.). In one embodiment, a security service is able to obtain and analyze event data from any number of different types of hypervisors, where each different type of hypervisor may represent events differently and/or make event data accessible in different ways, among other differences. By using hypervisor event processing microservices to abstract processes for obtaining hypervisor-generated event data and to normalize the obtained event data across different hypervisors, a security service can more efficiently and uniformly respond to occurrences of hypervisor events. For example, the hypervisor event processing microservices described herein enable efficient processing of hypervisor-generated event data regardless of specific types of hypervisors from which the event data originates, and regardless of how the event data is generated (e.g., by updating a log, sending a network notification, creating a number of events for an action that is different from a number of events created for the same action at other types of hypervisors, etc.). This capability provides both operational simplification and reliability improvement in environments with multiple hypervisors or hypervisors at different versions or configurations.

In an embodiment, an approach for processing hypervisor-generated event data comprises one or more hypervisor event processing microservices, where each of the microservices generally refers to one or more executable components of a network security system, such as the system described in Section 2.0, that monitors and performs actions relative to events for a variety of network security and other related purposes. As illustrated in FIG. 3, for example, a hypervisor event processing microservice or microservices (e.g., a hypervisor event proxy microservice 712, a hypervisor event normalization microservice 710, and a hypervisor event processing microservice 714) may be components of a security service 706, where the hypervisor event processing microservices represent individual microservices among a possible plurality of other microservices.

3.1. Hypervisor Event Processing Overview

As indicated above, some security services include functionality for obtaining, storing, and analyzing event data generated by various components of a computing environment. In the case of computing environments which include virtualized computing resources, one source of event data often may include the hypervisors upon which any number of virtual servers are running. According to embodiments described herein, a security service is able to efficiently obtain and analyze hypervisor-generated event data, regardless of the type of hypervisor from which the event data originates and/or how the event data is obtained from the hypervisors.

In one embodiment, processing and analyzing hypervisor-generated event data includes using any of a number of different mechanisms for obtaining the event data from various types of hypervisors. For example, one action performed by many types of hypervisors includes creating a new virtual server at a hypervisor; however, each type of hypervisor may generate different types of event data corresponding to the same action of creating a new virtual server. One type of hypervisor, for example, may send a pushed network notification when a new virtual server is created at the hypervisor, while another type of hypervisor may create several log entries when a new virtual server is created, and so forth. Furthermore, each of these different types of event data may be associated with a different mechanism for obtaining the event data. For example, a security service may poll for information from a particular log file to determine when a new virtual server event occurs at one type of hypervisor, while the same security service may receive pushed event data (e.g., a notification message) when a new virtual server is created at another type of hypervisor.

In an embodiment, processing and analyzing hypervisor-generated events may also involve translating event data generated by any of a number of different types of hypervisors into a normalized set of hypervisor event data. In general, a normalized set of hypervisor event data refers to a single set of hypervisor event representations used by the security service to make decisions about how to respond to occurrences of particular types of hypervisor events. For example, a normalized set of hypervisor event data may represent a same type of hypervisor event generated at two different types of hypervisors using a same event data format, even when the two different types of hypervisors generate different types of event data corresponding to the same type of event.

For example, one type of hypervisor (e.g., a hypervisor A) may generate several log entries in response to one type of hypervisor action (e.g., restarting a virtual server), where each log entry includes different types of information about the restart process (e.g., an identifier of the restarting virtual server, when the restarting process began, if the restart was successful, etc.). Another type of hypervisor (e.g., hypervisor B) may generate a single, pushed notification message in response the same type of hypervisor action (e.g., restarting a virtual server), where the notification message contains similar types of information as recorded by hypervisor A in the one or more log entries. According to embodiments described herein, a security service translates the event data generated by hypervisor A (e.g., the several log entries) and the event data generated by hypervisor B (e.g., the pushed notification message) corresponding to a same type of hypervisor action (e.g., restarting a virtual server) into a same, normalized event data format which can be further processed by the security service in a consistent manner.

Figure 8:
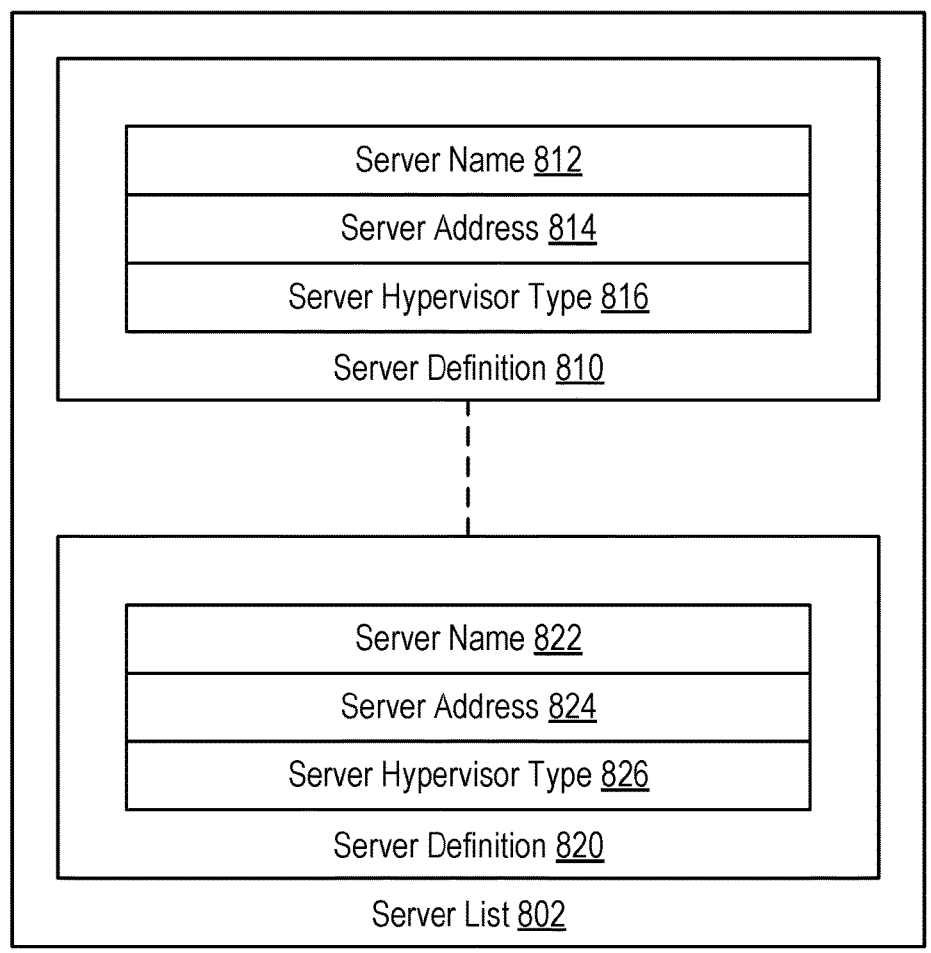
FIG. 8 is a block diagram illustrating an example server list in accordance with the disclosed embodiments.

In one embodiment, one or more components of a security service 706 (e.g., a hypervisor event proxy microservice 712) store information about physical servers for which the security service 706 is responsible for providing security services, and upon which an event generating hypervisor may be running. FIG. 8 is a diagram illustrating a server list 802 which may be used to store such information. In an embodiment, a security service 706 stores a server list 802 as entries in a database or other data store, as a file, or in any other data format and at any storage location accessible to the security service 706.

In the example of FIG. 8, a server list 802 includes any number of server definition entries 810 . . . 820, where each server definition entry includes a server name (e.g., a server name 812 and server name 822), a server address (e.g., a server address 814 and server address 824), and a server hypervisor type (e.g., a server hypervisor type 816 and server hypervisor type 826). For example, a security service 706 may create a separate server definition entry for each server (e.g., blade server, rack-mounted servers, or any other type of physical server) for which the service is responsible for providing security services, and may update the list as servers are added, removed, or modified.

Referring to server definition 810, for example, a server name 812 may be a label identifying a server, such as a host name or any other type of server identifier. A server address 814, for example, may include a network address (e.g., an IP address) or any other type of identifier which can be used to communicate with the server over a network. In an embodiment, a server hypervisor type 816 is any type of label, value, or other identifier which indicates a type of hypervisor running on the server corresponding to the server definition 810. For example, a value associated with a hypervisor type 816 field may specify a name associated with the hypervisor type (e.g., "VMware® ESXi™", "Microsoft® Hyper-V®", etc.), a value indicating a hypervisor type (e.g., "TypeA", "TypeB", etc.), or any other type of identifier. A hypervisor type 816 field may also include a null value, for example, if the server is not currently running a hypervisor.

Figure 9:
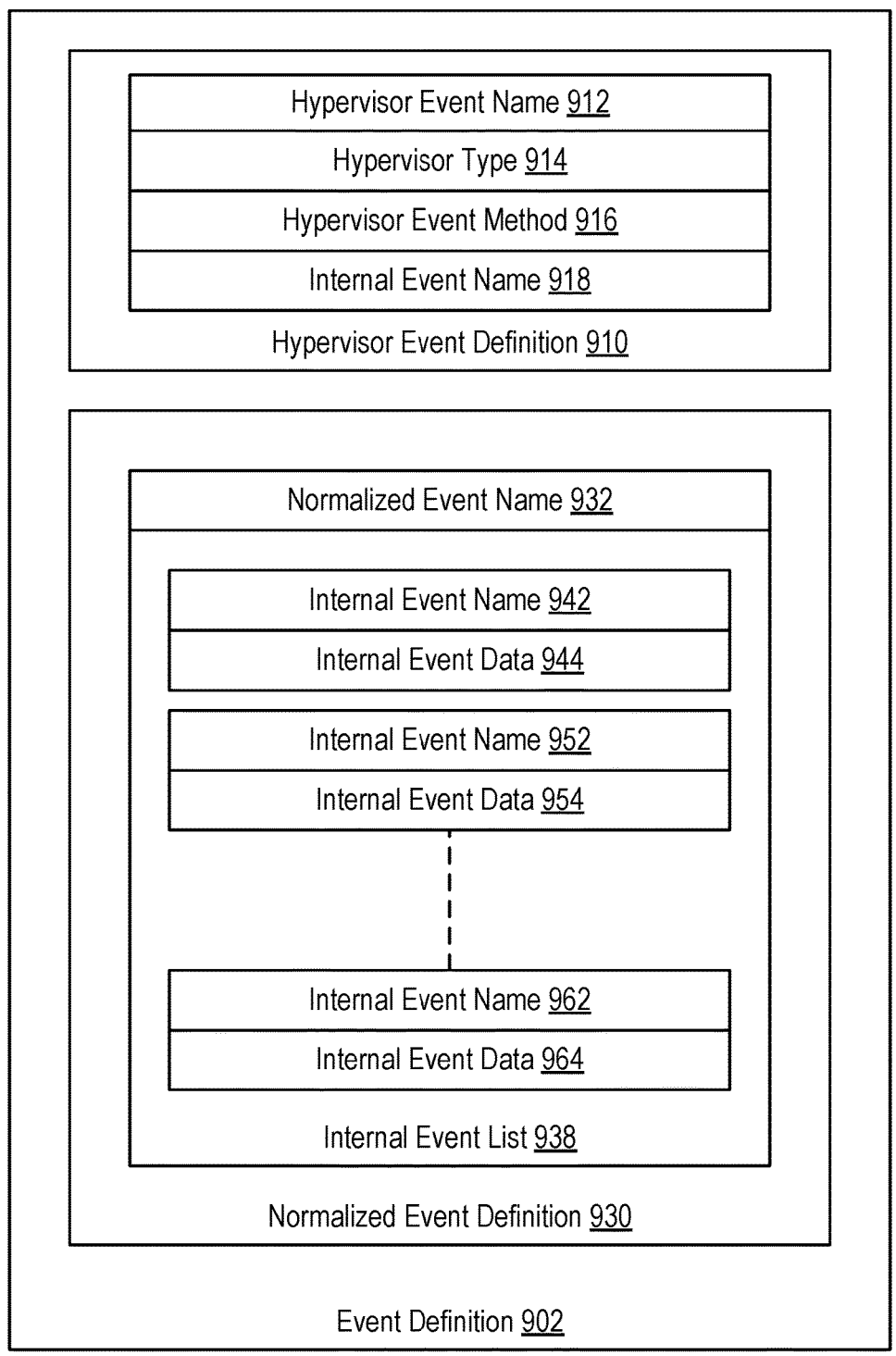
FIG. 9 is a block diagram illustrating an example security event definition in accordance with the disclosed embodiments.

In an embodiment, a security service 706 further stores information which maps various types of hypervisor event data generated by any number of different hypervisor types to a normalized event data format for more efficient processing by the security service 706 (e.g., by a hypervisor event processing microservice 714). FIG. 9 is a diagram illustrating an event definition, where an event definition stores information used by and within a hypervisor event proxy microservice 712 to determine how to obtain various types of hypervisor event data from different types of hypervisors, and information used to map hypervisor-generated event data to a normalized hypervisor event data format. In an embodiment, an event definition 902 comprises a hypervisor event definition 910 and a normalized event definition 930. In an embodiment, a security service 706 stores event definitions as entries in a database or other data store, as one or more files, or in any other data format and at any storage location accessible to the security service 706.

In an embodiment, each hypervisor event definition 910 represents a mapping between a type of event identified by a hypervisor event name 912, which may be specific to a particular type of hypervisor, and an internal event name 918 for the hypervisor-specific event. For example, whereas a hypervisor event may include hypervisor-specific structure and/or formatting (e.g., particular log entry formatting, notification message structure, etc.), an internal event name 918 may correspond to a more generally actionable event label such as "new virtual server created," virtual server off-line," "network connectivity lost," and so forth.

In an embodiment, a hypervisor type 914 identifies a type of hypervisor associated with the hypervisor event of the definition. A hypervisor type 914 may be identified by a name or label associated with the hypervisor type (e.g., "VMware® ESXi™", "Microsoft® Hyper-V®", etc.), a value indicating a hypervisor type (e.g., "Type A", "Type B", etc.), or by a null value (e.g., to indicate that the event relates to a physical server instead of a hypervisor). For example, the values specified in the hypervisor type 914 field may be the same as those used in the server hypervisor field of a server definition, as illustrated in FIG. 8.

In an embodiment, a hypervisor event method 916 indicates how a component of a security service (e.g., a hypervisor event proxy microservice 712) obtains events of the type corresponding to the hypervisor event definition 910. For example, an event method may indicate that a particular type of hypervisor event is obtained based on a push operation (e.g., received as a pushed notification message from a hypervisor), based on a pull operation (e.g., obtained by polling an event log or other data source), or based on any other type of operation for obtaining the event data.

As indicated above, an event definition 902 can be used to map hypervisor-generated events to a normalized event data format. As described in more detail in reference to process of FIG. 7, the process of mapping one or more hypervisor-generated events to a normalized hypervisor event may include using an internal event list 938. In an embodiment, a normalized event definition 930 includes a normalized event name 932 and an internal event list 938, where the internal event list 938 comprises a list of internal event name/data pairs (e.g., a pair consisting of internal event name 942 and internal event data 944, a pair consisting of internal event name 952 and internal event data 954, . . . , a pair consisting of internal event name 962 and internal event data 964).

In an embodiment, an internal event name (e.g., internal event name 942) corresponds to an internal event name for a particular type of hypervisor-generated event, for example, corresponding to an internal event name 918 specified in a hypervisor event definition 910. At a high level, an internal event list 938 comprises a "checklist" of one or more internal events, the collective occurrence of which may correspond to an occurrence of a normalized hypervisor event. For example, when a hypervisor event normalization microservice 710 determines that each internal event of an internal event list has occurred, the microservice may generate a normalized event for further processing by a hypervisor event processing microservice 714.

3.2 Obtaining Hypervisor Events

In an embodiment, a security service 706 obtains event data from any number of hypervisors running within one or more computing environments for which the security service 706 is responsible for providing security. At a high level, a security service 706 obtaining event data from hypervisors may include obtaining hypervisor event data using different methods (e.g., obtaining some types of event data based on polling for the event data, receiving other types of event data as pushed events, or based on any other processes). For example, a security service 706 may include a hypervisor event proxy microservice 712 which obtains, based on configuration information, event data from any number of separate hypervisors, different types of hypervisors, and based on different methods for obtaining the event data.

In an embodiment, one method for obtaining some types of event data may include polling hypervisors or associated components for the event data. For example, some types of event data may be generated by hypervisors and stored in a log file, a database, or other type of local data source. In these instances, and others, a hypervisor event proxy microservice 712 may periodically poll the hypervisors to determine whether any new event data has been generated. As described below in reference to FIG. 11, this may be in contrast to other types of event data that are "pushed" from hypervisors, for example, based on a generated notification, network message, or other type of indication sent from a hypervisor to a hypervisor event proxy microservice 712.

Figure 10:
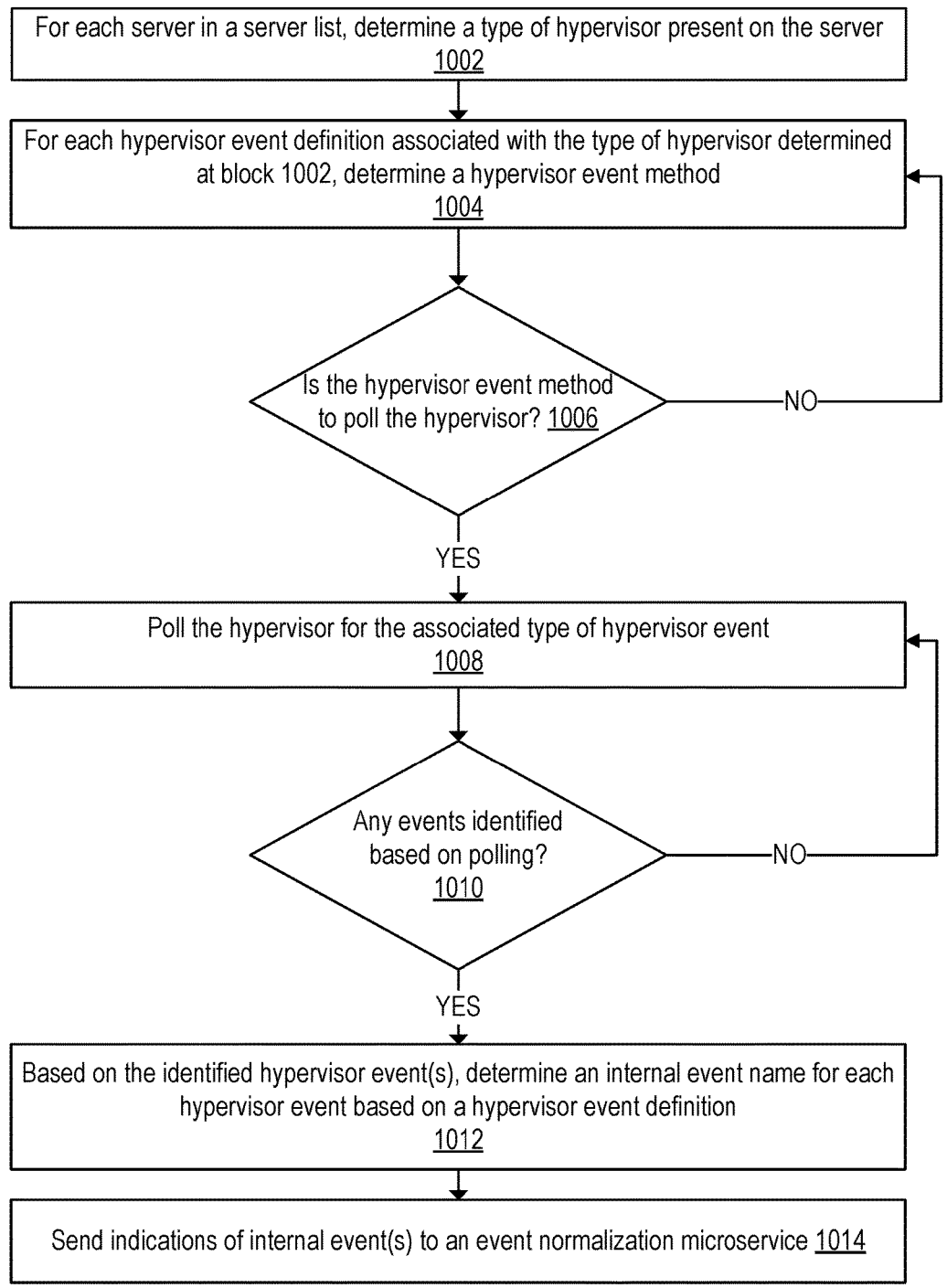
FIG. 10 is a flow diagram illustrating an example method for polling hypervisors for event data in accordance with the disclosed embodiments.

FIG. 10 is a flow diagram illustrating a method performed by a hypervisor event proxy microservice for determining which types of hypervisor event data are obtained using a polling method, and for obtaining hypervisor event data determined to be associated with a polling method according to an embodiment.

At block 1002, for each server in a server list, a hypervisor event proxy microservice determines a type of hypervisor running on the server. In an embodiment, a hypervisor event proxy microservice 712 iterates through a server list 802 and, for each server definition in the list, determines a type of hypervisor running on the server based on a server hypervisor type 816 field. As described above in reference to FIG. 8, in an embodiment, the server hypervisor type field includes a label, value, or any other identifier of a type of hypervisor running on the server corresponding to the server definition.

At block 1004, a hypervisor event proxy microservice determines, for each hypervisor event definition associated with the type of hypervisor determined at block 1002, a hypervisor event method. In an embodiment, based on a type of hypervisor determined at block 1002, a hypervisor event proxy microservice 712 searches a list of hypervisor event definitions 910 to identify definitions which indicate a hypervisor type that is the same as the hypervisor type identified at block 1002. For each of the identified hypervisor event definitions, the hypervisor event proxy microservice 712 identifies a hypervisor event method 916. As described above in reference to FIG. 9, in an embodiment, the hypervisor event method 916 indicates a mechanism for obtaining hypervisor events of the type represented by the event definition such as, for example, polling for the event data, receiving a pushed event, or any other type of method for obtaining event data.

At block 1006, a hypervisor event proxy microservice determines whether the hypervisor event method indicates that the type of hypervisor event is obtained by polling. In an embodiment, a hypervisor event proxy microservice 712 determines whether the hypervisor event method 916 field of the current hypervisor event definition 910 indicates that the corresponding type of hypervisor event is obtained by polling the hypervisor or other associated component. If the hypervisor event proxy microservice 712 determines that the hypervisor event method is not polling, then the process returns to block 1004 to examine a next hypervisor event definition in the list.

At block 1008, if the hypervisor event proxy microservice determines that the hypervisor event method is polling, then the hypervisor event proxy microservice 712 polls the associated hypervisor for the type of hypervisor event. In an embodiment, a hypervisor event proxy microservice 712 polls the corresponding hypervisor using a server address indicated in the corresponding server definition, as illustrated in FIG. 8. In an embodiment, the hypervisor event proxy microservice polling the hypervisor includes sending a request for the hypervisor event data to the hypervisor (e.g., via a corresponding interface microservice), directly accessing the hypervisor event data from a data source (e.g., accessing the data in a log file, database, or other data source), or any other mechanism for polling the data from the hypervisor. In an embodiment, the hypervisor event proxy microservice continues the poll the hypervisor on a periodic basis.

At block 1010, the hypervisor event proxy microservice determines whether any hypervisor events are identified based on the polling performed at block 1008. In an embodiment, a hypervisor event proxy microservice 712 determines, based on polling the hypervisor, whether any new event data exists at the polled resource(s) relative to the previous polling instance. If no new event data is found, the process returns to block 1008, where the hypervisor event proxy microservice continues to poll for new hypervisor event data.

At block 1012, if the hypervisor event proxy microservice identifies one or more new hypervisor events based on polling the hypervisor, the microservice determines an internal event name for the identified hypervisor event(s) using a hypervisor event definition. As described above, a hypervisor event proxy microservice 712 identifies the one or more hypervisor events based on polling for the type of hypervisor event identified in a hypervisor event definition 910. In an embodiment, the hypervisor event proxy microservice 712 then determines an internal event name for the hypervisor event by referencing the internal event name 918 for the same hypervisor event definition 910.

At block 1014, the hypervisor event proxy microservice sends an indication of the internal event to an event normalization microservice. In an embodiment, a hypervisor event proxy microservice 712 sends an indication of each identified internal event to a hypervisor event normalization microservice 710, where the hypervisor event normalization microservice 710 performs further analysis on the internal event, as described below in reference to FIG. 12.

Figure 11:
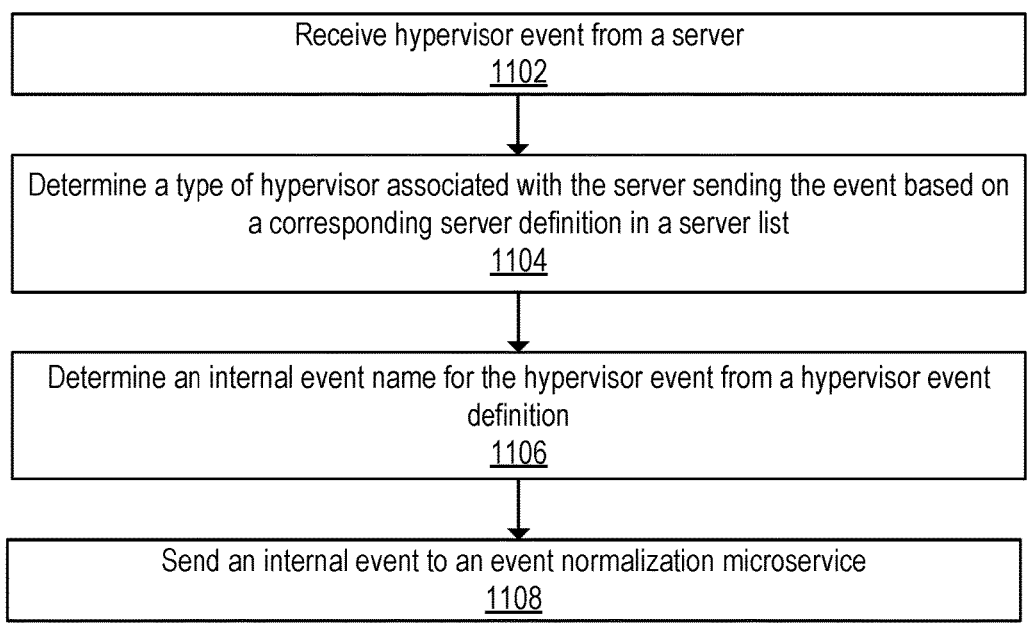
FIG. 11 is a flow diagram illustrating an example method for processing event data pushed from hypervisors in accordance with the disclosed embodiments.

FIG. 11 is a flow diagram illustrating an example method performed by a hypervisor event proxy microservice for receiving and processing hypervisor event data pushed from hypervisors according to an embodiment. For example, whereas FIG. 10 describes a process for polling hypervisors for certain types of hypervisor events, FIG. 11 illustrates an example process for obtaining event data pushed from hypervisors without an explicit request for the data.

At block 1102, a hypervisor event proxy microservice receives a hypervisor event from a server. In an embodiment, a hypervisor event proxy microservice 712 receives the hypervisor event from a server running one or more of hypervisors 720, 730, 740, or 750, or from a virtual server running on one of the hypervisors. In an embodiment, the hypervisor event proxy microservice receives the event as a network message, a notification message, or any other type of data pushed from a server to a hypervisor event proxy microservice 712.

At block 1104, a type of hypervisor associated with the server sending the event is determined based on a corresponding server definition in a server list. In an embodiment, a hypervisor event proxy microservice 712 identifies a server name, a server address, or other identifier of the server sending the event indication, and uses the information to determine a type of hypervisor associated with the server using a server definition from a server list 802. In one embodiment, the hypervisor event proxy microservice 712 uses information associated with the type of server, for example, to parse the event message, to associate additional information with the received message, or to perform other operations.

At block 1106, a hypervisor event proxy microservice determines, based on a hypervisor event definition, an internal event name for the hypervisor event. In an embodiment, based on the type of hypervisor determined at block 1104 and additional information associated with the event message, a hypervisor event proxy microservice 712 identifies a hypervisor event definition 910 indicating an internal event name for the type of event received.

At block 1108, the hypervisor event proxy microservice sends the internal event to a hypervisor event normalization microservice. In an embodiment, a hypervisor event proxy microservice 712 sends the name or other identifier of the internal event to a hypervisor event normalization microservice 710, including any additional data associated with the event. For example, if the pushed event indicates that a hypervisor created a new virtual server, the internal event indicates to a hypervisor event normalization microservice 710 that a new virtual server event has occurred, and may further include additional information related to the event (e.g., a time at which the virtual server was created, an operating system associated with the virtual server, etc.) As described below in reference to FIG. 12, in an embodiment, some or all of additional information related to the event is included with normalized event info sent to a hypervisor event normalization microservice 710 for further processing.

3.3 Normalizing Hypervisor Events

Figure 12:
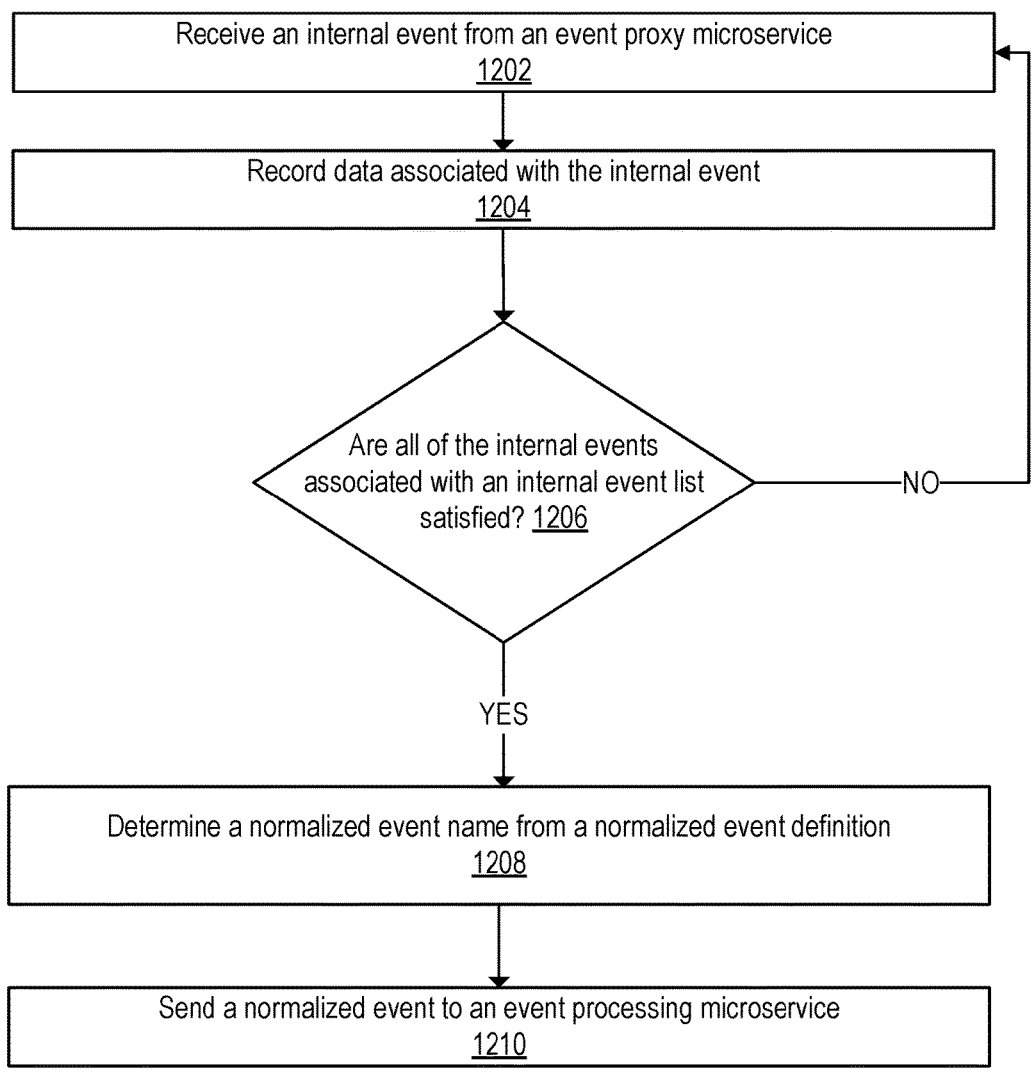
FIG. 12 is a flow diagram illustrating an example of processing internal hypervisor events to generate normalized hypervisor events in accordance with the disclosed embodiments.

As described above in reference to FIGS. 10 and 11, a security service may use a hypervisor event proxy microservice to abstract processes for obtaining event data from hypervisors. For example, whether event data generated by one or more hypervisors is obtained using a polling method, by receiving pushed event data, or using any other mechanism, a hypervisor event proxy microservice 712 sends internal events to a hypervisor event normalization microservice 710. In one embodiment, based on the internal events generated by a hypervisor event proxy microservice 712, a hypervisor event normalization microservice 710 may further normalize the event data into a normalized event data format. FIG. 12 is a flow diagram illustrating a method performed by an event normalization microservice to process internal event data into a normalized event data format according to an embodiment.

At block 1202, a hypervisor event normalization microservice receives an internal event from a hypervisor event proxy microservice. For example, a hypervisor event normalization microservice 710 may receive an internal event from a hypervisor event proxy microservice 712 in response to the hypervisor event proxy microservice 712 obtaining an event from a hypervisor and translating the hypervisor event to an internal event, as described above in reference to FIGS. 10 and 11.

At block 1204, the hypervisor event normalization microservice records data associated with the internal event. For example, the internal event data received by a hypervisor event normalization microservice 710 from a hypervisor event proxy microservice 712 may include data associated with the internal event such as a time stamp, a label for the event, an identifier of the hypervisor and/or server which generated the underlying hypervisor event, or any other data included with the event by a hypervisor event proxy microservice 712. The hypervisor event proxy microservice 712 may record the data associated with the internal event, for example, as part of an internal event list (e.g., internal event list 938) to indicate which types of internal events have been previously received.

At block 1206, a determination is made as to whether all of the internal events within an internal event list are satisfied. In one embodiment, a hypervisor event normalization microservice 710 determines that an internal event list is satisfied when data has been recorded (e.g., as described at block 1204) for each internal event of the list. In an embodiment, an internal event list comprises a checklist, bitmap, or any other data structure that enables a hypervisor event normalization microservice 710 to determine when each internal event of a set of internal events has been received. If none of the internal event lists are currently satisfied, then the process returns to block 1202 where the hypervisor event normalization microservice 710 awaits the receipt of further internal events from a hypervisor event proxy microservice 712. As a simple example, if an internal event list 938 contains no entries or only a single entry, then a normalized event is sent for each corresponding internal event identified. Other example internal event lists contain any number of internal event name/internal event data pairs corresponding to a normalized hypervisor event.

At block 1208, in response to determining that an internal event list is satisfied, a normalized event name from a normalized event definition is determined. In an embodiment, in response to determining that all of the internal events of an internal event list 938 have been satisfied, a hypervisor event normalization microservice 710 determines a corresponding normalized event name 932 from a normalized event definition 930.

At block 1210, a normalized event is transmitted to an event processing microservice. In an embodiment, a hypervisor event normalization microservice 710 sends a normalized hypervisor event to a hypervisor event processing microservice 714 for further processing. In an embodiment, the normalized event includes some or all of the data associated with the internal event received from the hypervisor event proxy microservice (e.g., including a time at which the associated action occurred, an operating system associated with the corresponding virtual server, address information for the corresponding virtual server, etc.).

In an embodiment, the hypervisor event processing microservice 714, for example, takes one or more security actions (e.g., by configuring one or more network settings, firewall settings, antivirus and/or malware settings, etc.), hypervisor configuration actions (e.g., by shutting down one or more hypervisors and/or virtual servers, restarting one or more hypervisors and/or virtual servers, creating one or more new hypervisors and/or virtual servers, etc.), or any other actions based on receiving the normalized events. Because the hypervisor event normalization microservice 710 translates the events received from any type of hypervisor into a single set of normalized events, a hypervisor event processing microservice 714 can perform actions based on logic that is independent of the type of hypervisor which generated the underlying event data.

4.0. Example Embodiments

Examples of some embodiments are represented, without limitation, by the following:

In an embodiment, a method or non-transitory computer readable medium comprises: for each server of a plurality servers identified in a server list: determining, based on a mapping of servers to hypervisor types, a type of hypervisor running on the server; and further determining, based on a mapping of hypervisor types to event definitions, a set of event definitions associated with the determined type of hypervisor running on the server; wherein each event definition of the set of event definitions indicates whether occurrences of hypervisor events corresponding to the event definition are detected based on one of a push operation or a pull operation; detecting, based on the set of event definitions, occurrences of a plurality of hypervisor events; determining whether an occurrence of one or more hypervisor events of the plurality of hypervisor events satisfies a defined event list, the defined event list representing a normalized event; in response to determining that the occurrence of the one or more hypervisor events satisfies an internal event list, generating a normalized event.

In an embodiment, a method or non-transitory computer readable medium comprises: wherein each server of the plurality of servers is managed by a computing security service.

In an embodiment, a method or non-transitory computer readable medium comprises: wherein the mapping of servers to hypervisor types includes a list of server definitions, wherein each server definition specifies a server name, a server address, and a server hypervisor type.

In an embodiment, a method or non-transitory computer readable medium comprises: wherein the mapping of hypervisor types to event definitions is stored as a list of hypervisor event definitions, wherein each hypervisor event definition specifies a hypervisor event name, a hypervisor event type, a hypervisor event method, and an internal event name.

In an embodiment, a method or non-transitory computer readable medium comprises: wherein detecting an occurrence of at least one hypervisor event of the plurality of hypervisor events comprises polling a hypervisor hosted by a server of the plurality of servers.

In an embodiment, a method or non-transitory computer readable medium comprises: wherein detecting an occurrence of at least one hypervisor event of the plurality of hypervisor events comprises polling a hypervisor hosted by a server of the plurality of servers, wherein the hypervisor is polled using a network address stored for the hypervisor in the mapping of servers to hypervisor types.

In an embodiment, a method or non-transitory computer readable medium comprises: wherein detecting an occurrence of at least one hypervisor event of the plurality of hypervisor events comprises receiving a pushed event from a hypervisor hosted by a server of the plurality of servers.

In an embodiment, a method or non-transitory computer readable medium comprises: wherein the defined event list is one of a plurality of defined event lists.

In an embodiment, a method or non-transitory computer readable medium comprises: wherein the defined event list is one of a plurality of defined event lists, and wherein at least one defined event list of the plurality of defined event lists is satisfied based on identifying an occurrence of a single hypervisor event.

In an embodiment, a method or non-transitory computer readable medium comprises: wherein a security service performs one or more security measures based on the normalized event definition.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof.

Such special-purpose computing devices may also combine custom hard-wired logic, ASICs, or FPGAs with custom programming to accomplish the techniques.

Figure 13:
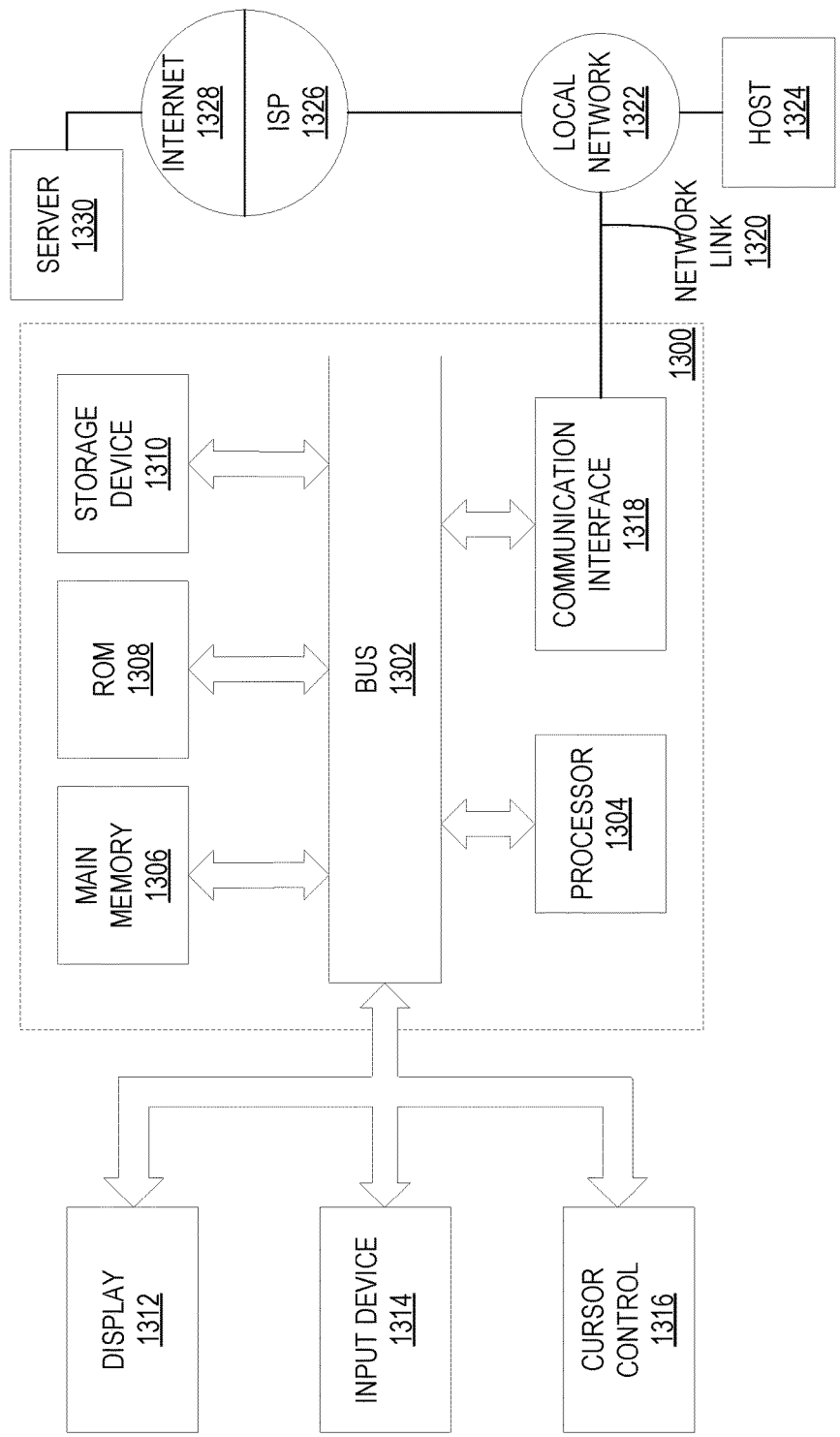
FIG. 13 illustrates a computer system upon which an embodiment may be implemented.

FIG. 13 is a block diagram that illustrates a computer system 1300 utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more buses 1302 or other communication mechanism for communicating information, and one or more hardware processors 1304 coupled with buses 1302 for processing information. Hardware processors 1304 may be, for example, general purpose microprocessors. Buses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send messages and receive data, including program code and/or other types of instructions, through the network(s), network link 1320, and communication interface 1318. In the Internet example, a server X30 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In an embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
for each server of a plurality of servers identified in a server list, a hypervisor event proxy microservice:
determining, based on a mapping of servers to hypervisor types, a type of hypervisor running on the server, and
further determining, based on a mapping of hypervisor types to event definitions, a set of event definitions associated with the determined type of hypervisor running on the server,
wherein each event definition of the set of event definitions indicates whether occurrences of hypervisor events corresponding to the event definition are detected based on one of a push operation or a pull operation;
detecting, by the hypervisor event proxy microservice, occurrences of a plurality of hypervisor events, wherein each hypervisor event of the plurality of hypervisor events is detected by the hypervisor event proxy microservice based on one of: a push operation performed by a hypervisor, or a pull operation performed by the hypervisor event proxy microservice;

determining, by an event normalization microservice, whether an occurrence of one or more hypervisor events of the plurality of hypervisor events satisfies a defined event list, the defined event list representing a normalized event; and in response to determining that the occurrence of the one or more hypervisor events satisfies an internal event list, generating a normalized event.

2. The method of claim 1, wherein each server of the plurality of servers is managed by a computing security service.

3. The method of claim 1, wherein the mapping of servers to hypervisor types is stored as a list of server definitions, wherein each server definition specifies a server name, a server address, and a server hypervisor type.

4. The method of claim 1, wherein the mapping of hypervisor types to event definitions includes a list of hypervisor event definitions, wherein each hypervisor event definition specifies a hypervisor event name, a hypervisor event type, a hypervisor event method, and an internal event name.

5. The method of claim 1, wherein detecting an occurrence of at least one hypervisor event of the plurality of hypervisor events comprises polling a hypervisor hosted by a server of the plurality of servers.

6. The method of claim 1, wherein detecting an occurrence of at least one hypervisor event of the plurality of hypervisor events comprises polling a hypervisor hosted by a server of the plurality of servers, wherein the hypervisor is polled using a network address stored for the hypervisor in the mapping of servers to hypervisor types.

7. The method of claim 1, wherein detecting an occurrence of at least one hypervisor event of the plurality of hypervisor events comprises receiving a pushed event from a hypervisor hosted by a server of the plurality of servers.

8. The method of claim 1, wherein the defined event list is one of a plurality of defined event lists.

9. The method of claim 1, wherein the defined event list is one of a plurality of defined event lists, and wherein at least one defined event list of the plurality of defined event lists is satisfied based on identifying an occurrence of a single hypervisor event.

10. The method of claim 1, wherein a security service performs one or more security measures based on the normalized event.

11. A non-transitory computer-readable storage medium storing instructions which, when executed by one or more processors, cause performance of:

for each server of a plurality of servers identified in a server list, a hypervisor event proxy microservice:
  determining, based on a mapping of servers to hypervisor types, a type of hypervisor running on the server, and
  further determining, based on a mapping of hypervisor types to event definitions, a set of event definitions associated with the determined type of hypervisor running on the server,
  wherein each event definition of the set of event definitions indicates whether occurrences of hypervisor events corresponding to the event definition are detected based on one of a push operation or a pull operation;

detecting, by the hypervisor event proxy microservice, occurrences of a plurality of hypervisor events, wherein each hypervisor event of the plurality of hypervisor events is detected by the hypervisor event proxy microservice based on one of: a push operation performed by a hypervisor, or a pull operation performed by the hypervisor event proxy microservice;

determining, by an event normalization microservice, whether an occurrence of one or more hypervisor events of the plurality of hypervisor events satisfies a defined event list, the defined event list representing a normalized event; and in response to determining that the occurrence of the one or more hypervisor events satisfies an internal event list, generating a normalized event.

12. The non-transitory computer-readable storage medium of claim 11, wherein each server of the plurality of servers is managed by a computing security service.

13. The non-transitory computer-readable storage medium of claim 11, wherein the mapping of servers to hypervisor types is stored as a list of server definitions, wherein each server definition specifies a server name, a server address, and a server hypervisor type.

14. The non-transitory computer-readable storage medium of claim 11, wherein the mapping of hypervisor types to event definitions includes a list of hypervisor event definitions, wherein each hypervisor event definition specifies a hypervisor event name, a hypervisor event type, a hypervisor event method, and an internal event name.

15. The non-transitory computer-readable storage medium of claim 11, wherein detecting an occurrence of at least one hypervisor event of the plurality of hypervisor events comprises polling a hypervisor hosted by a server of the plurality of servers.

16. The non-transitory computer-readable storage medium of claim 11, wherein detecting an occurrence of at least one hypervisor event of the plurality of hypervisor events comprises polling a hypervisor hosted by a server of the plurality of servers, wherein the hypervisor is polled using a network address stored for the hypervisor in the mapping of servers to hypervisor types.

17. The non-transitory computer-readable storage medium of claim 11, wherein detecting an occurrence of at least one hypervisor event of the plurality of hypervisor events comprises receiving a pushed event from a hypervisor hosted by a server of the plurality of servers.

18. The non-transitory computer-readable storage medium of claim 11, wherein the defined event list is one of a plurality of defined event lists.

19. The non-transitory computer-readable storage medium of claim 11, wherein the defined event list is one of a plurality of defined event lists, and wherein at least one defined event list of the plurality of defined event lists is satisfied based on identifying an occurrence of a single hypervisor event.

20. The non-transitory computer-readable storage medium of claim 11, wherein a security service performs one or more security measures based on the normalized event.

21. An apparatus, comprising:
one or more processors;
a non-transitory computer-readable storage medium coupled to the one or more processors, the computer-readable storage medium storing instructions which, when executed by the one or more processors, causes the apparatus to:

for each server of a plurality of servers identified in a server list, a hypervisor event proxy microservice:
  determine, based on a mapping of servers to hypervisor types, a type of hypervisor running on the server, and
  further determine, based on a mapping of hypervisor types to event definitions, a set of event definitions associated with the determined type of hypervisor running on the server,
  wherein each event definition of the set of event definitions indicates whether occurrences of hypervisor events corresponding to the event definition are detected based on one of a push operation or a pull operation;
detect, by the hypervisor event proxy microservice, occurrences of a plurality of hypervisor events, wherein each hypervisor event of the plurality of hypervisor events is detected by the hypervisor event proxy microservice based on one of: a push operation performed by a hypervisor, or a pull operation performed by the hypervisor event proxy microservice;
determine, by an event normalization microservice, whether an occurrence of one or more hypervisor events of the plurality of hypervisor events satisfies a defined event list, the defined event list representing a normalized event; and
in response to determining that the occurrence of the one or more hypervisor events satisfies an internal event list, generate a normalized event.

22. The apparatus of claim 21, wherein each server of the plurality of servers is managed by a computing security service.

23. The apparatus of claim 21, wherein the mapping of servers to hypervisor types is stored as a list of server definitions, wherein each server definition specifies a server name, a server address, and a server hypervisor type.

24. The apparatus of claim 21, wherein the mapping of hypervisor types to event definitions is stored as a list of hypervisor event definitions, wherein each hypervisor event definition specifies a hypervisor event name, a hypervisor event type, a hypervisor event method, and an internal event name.

25. The apparatus of claim 21, wherein detecting an occurrence of at least one hypervisor event of the plurality of hypervisor events comprises polling a hypervisor hosted by a server of the plurality of servers.

26. The apparatus of claim 21, wherein detecting an occurrence of at least one hypervisor event of the plurality of hypervisor events comprises polling a hypervisor hosted by a server of the plurality of servers, wherein the hypervisor is polled using a network address stored for the hypervisor in the mapping of servers to hypervisor types.

27. The apparatus of claim 21, wherein detecting an occurrence of at least one hypervisor event of the plurality of hypervisor events comprises receiving a pushed event from a hypervisor hosted by a server of the plurality of servers.

28. The apparatus of claim 21, wherein the defined event list is one of a plurality of defined event lists.

29. The apparatus of claim 21, wherein the defined event list is one of a plurality of defined event lists, and wherein at least one defined event list of the plurality of defined event lists is satisfied based on identifying an occurrence of a single hypervisor event.

30. The apparatus of claim 21, wherein a security service performs one or more security measures based on the normalized event.

* * * * *